UNITED STATES PATENT OFFICE.

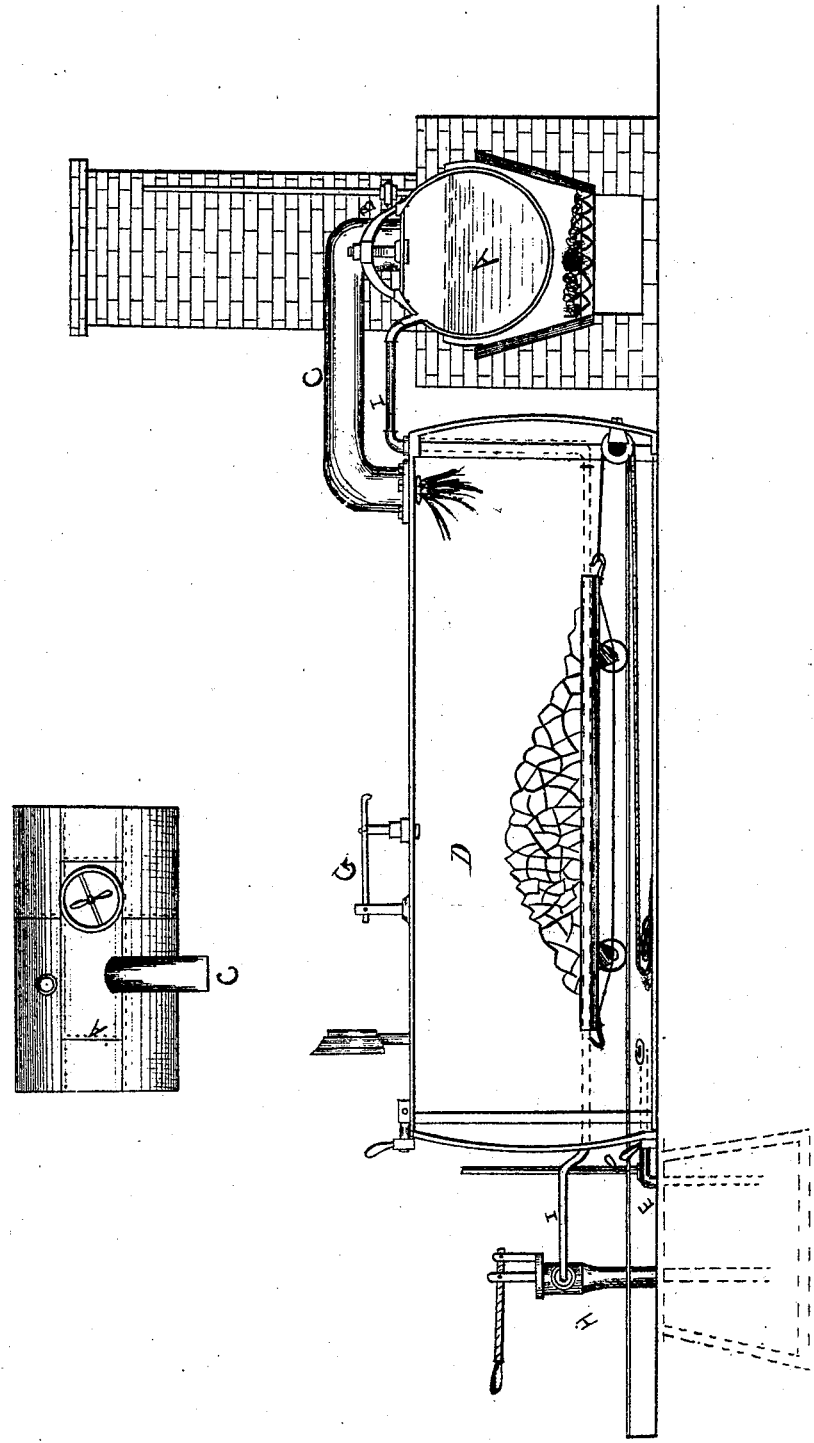

LOUIS S. ROBBINS, OF NEW YORK, N. Y.

IMPROVED DISINFECTING COMPOUNDS.

Specification forming part of Letters Patent No. 100,327, dated March 1, 1870.

*To all whom it may concern:*

Be it known that I, LOUIS S. ROBBINS, of the city, county, and State of New York, have invented a new and improved powder impregnated with carbolic acid; and I do hereby declare that the following is a full and clear description thereof, which will enable others skilled in the art to make and use the same, reference being had to the accompanying drawings.

It is a well-known fact that carbolic acid possesses disinfecting and antiseptic properties of the most remarkable character, and when properly applied will prevent and arrest those changes both in animal and vegetable substances which occasion putrefaction and decay, and the exhalations of poisonous gases which cause sickness and disease. Besides, it will destroy insects or the eggs and germs from which they spring, and all parasitic growths, which multiply so rapidly in the process of decomposition of animal and vegetable substances.

Hitherto carbolic acid has been manufactured and employed to some extent in a liquid state as a disinfectant, but in this condition it cannot be used with safety or economy.

The object of my invention is the production of a powder impregnated with carbolic acid by the process herein described.

One form of apparatus for producing carbolic acid and saturating the material to be used for disinfecting purposes is represented in the accompanying plate.

A in the drawing represents a retort made of any desired form or size, in which coal-tar or any similar substance or compound containing carbolic acid is placed and subjected to the action of heat from any suitable furnace.

B represents the man-hole of the retort used in cleansing the same or changing its contents.

C is a pipe connecting retort A with chamber or receptacle D.

E represents a discharge-pipe employed for removing the remaining contents after the operation is over.

F is a pressure-gage; G, a safety-valve; H, a pump employed to supply to the retort A the material used for the production of carbolic acid.

Heat being applied to retort A, previously filled to about two-thirds of its capacity with an oleaginous product, distilled from coal-tar at the temperature varying from 369° to 450° Fahrenheit, the vapors of carbolic acid are generated therein, which pass out of the same through the connecting-pipe C into chamber D, which has been filled to about one-third its capacity with clay or other suitable substance to be treated. The chamber D being made of iron in the form of a steam-boiler and steam-tight, the vapors which are confined or not allowed to escape from the chamber produce a pressure from one to five pounds to the square inch, which forces into and condenses the vapors in the clay, saturating and impregnating the same with carbolic acid in the most perfect and efficient manner.

When the operation has been continued for a sufficient length of time the clay or substance treated is withdrawn and the chamber again filled for a subsequent operation.

The clay, after the treatment, is to be reduced to a powder, by passing it through a mill constructed with different-sized rollers, such as are now employed to pulverize coarse sugar.

From the above description it is apparent that by my process I am enabled to produce the carbolic acid and impregnate the clay or other substances employed in the preparation of the disinfecting-powder in a more rapid, thorough, and economical manner than can be accomplished by the use of carbolic acid in a liquid state.

What I claim as new, and desire to secure by Letters Patent, is—

A combined disinfectant and insect-destroyer, being a powder of clay, lime, or chalk impregnated by the process herein described.

LOUIS S. ROBBINS.

Witnesses:
NATHANIEL GILL,
WM. H. CLARKSON.